United States Patent
Jiang et al.

(10) Patent No.: US 7,263,231 B2
(45) Date of Patent: Aug. 28, 2007

(54) METHOD AND APPARATUS FOR PERFORMING VIDEO IMAGE DECODING

(75) Inventors: Hong H. Jiang, El Dorado Hills, CA (US); Allen H. Simon, Chandler, AZ (US); Val G. Cook, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 10/379,187

(22) Filed: Mar. 3, 2003

(65) Prior Publication Data

US 2003/0198392 A1 Oct. 23, 2003

Related U.S. Application Data

(63) Continuation of application No. 09/470,741, filed on Dec. 20, 1999.

(51) Int. Cl.
*G06K 9/36* (2006.01)
(52) U.S. Cl. ...................................... 382/233
(58) Field of Classification Search ........ 382/232–233, 382/236, 250, 298–299, 154, 300, 107; 375/240.01, 375/240.16–240.21, 240.25; 345/419; 348/402.1–420.1, 348/719; 386/50–52, 109
See application file for complete search history.

(56) References Cited

U.S. PATENT DOCUMENTS

| | | | |
|---|---|---|---|
| 5,262,854 A * | 11/1993 | Ng | 375/240.24 |
| 5,614,952 A | 3/1997 | Boyce et al. | 375/240.01 |
| 5,614,957 A | 3/1997 | Boyce et al. | 348/567 |
| 5,635,985 A | 6/1997 | Boyce et al. | 375/240.15 |
| 5,673,358 A | 9/1997 | Boyce | 386/112 |
| 5,684,539 A | 11/1997 | Boyce et al. | 375/240.24 |
| 6,175,592 B1 * | 1/2001 | Kim et al. | 375/240.16 |
| 6,215,822 B1 * | 4/2001 | Bose et al. | 375/240.16 |
| 6,222,550 B1 * | 4/2001 | Rosman et al. | 345/419 |

FOREIGN PATENT DOCUMENTS

| | | |
|---|---|---|
| EP | 0 648 057 A2 | 4/1995 |
| GB | 2 305 325 A | 4/1997 |

OTHER PUBLICATIONS

Vetro et al., Frequency Domain Down-Conversion of HDTV Using an Optimal Motion Compensation Scheme, International Journal of Imaging System and Technology, vol. 9, No. 4, Aug. 1998.*

(Continued)

*Primary Examiner*—Ishrat Sherali
(74) *Attorney, Agent, or Firm*—Sharon Wong

(57) ABSTRACT

In one embodiment, a method of performing video image decoding includes the following. A compressed video image is downsampled in the frequency domain. The downsampled video image is inverse transformed. Motion compensation for the downsampled image is performed in the spatial domain.

24 Claims, 11 Drawing Sheets

OTHER PUBLICATIONS

Dugad et al. A Fast Scheme for Altering Rresolution in the Compressed Domain, IEEE 0-7695-0149-4/99.*

Huifang Sun, "Hierarchical Decoder for MPEG Compressed Video Data", IEEE Transactions on Consumer Electronics, IEEE Inc. New York, vol. 39, No. 3, Aug. 1, 1993, XP0003963332, ISSN: 0098-3063 (pp. 559-564).

Anthony Vetro, et al., "On the Motion Compensation Within a Down-Conversion Decoder", Journal of Electronic Imaging, vol. 7, No. 3, Jul. 1998 (pp. 616-627).

B. W. Y. Wei, et al., "Video Coding for HDTV Systems", IEEE Comp. Soc. Press, vol. Conf. 18, Nov. 9, 1994 (pp. 469-475).

* cited by examiner

Field picture type with field prediction

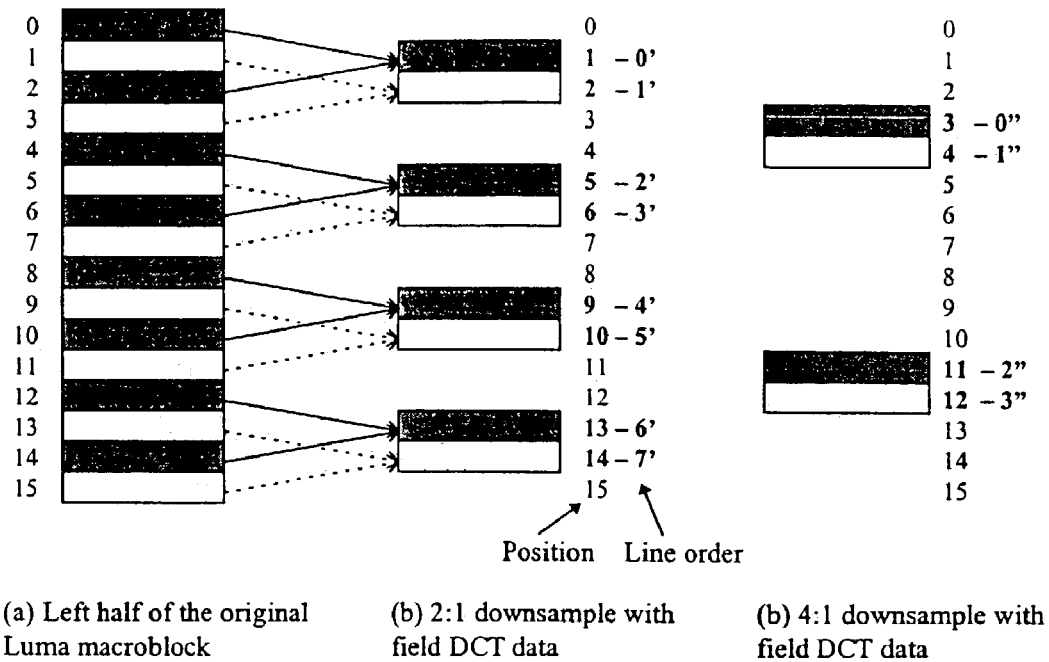

(a) Left half of the original Luma macroblock (b) 2:1 downsample with field DCT data (b) 4:1 downsample with field DCT data

Figure 4

Frame picture type with field prediction
(1) for macroblock with frame DCT and frame prediction

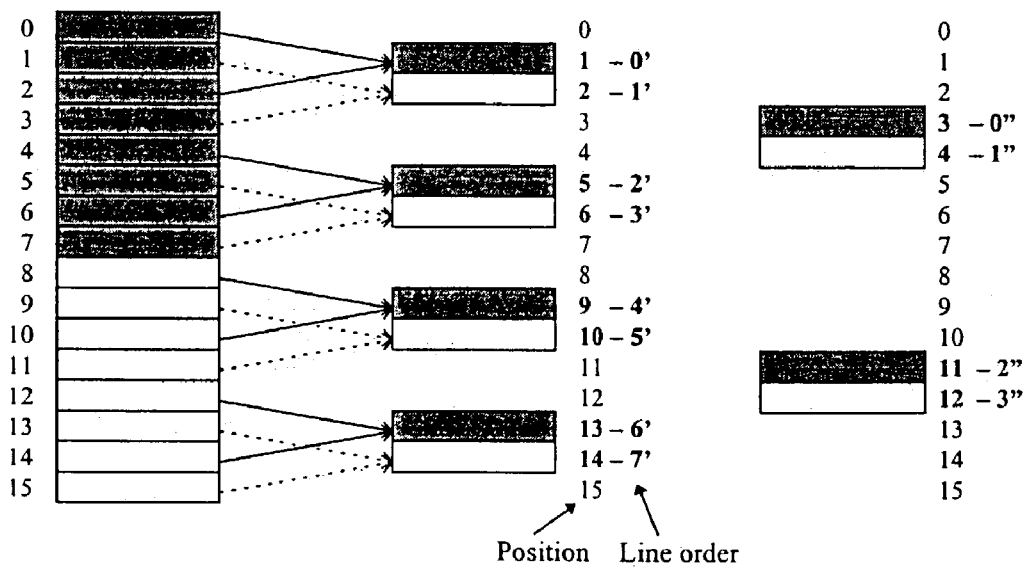

(a) Left half of the original Luma macroblock output from frame iDCT (b) 2:1 field-like downsample after frame iDCT (b) 4:1 field-like downsample after frame iDCT

Figure 5

Frame picture type with field prediction
(2) macroblock with field DCT and field prediction (a) Left half of the original Luma macroblock
(b) 2:1 downsample with field DCT data
(b) 4:1 downsample with field DCT data

| Source (Top field) | Destination (Display) | Source (Bottom field) | Destination (Display) |
|---|---|---|---|
| Src[0] = Line 0 | DDA[0] = 0.000 | | DDA[0] = -0.500 |
| | DDA[1] = 0.375 | Src[0] = Line 1 | DDA[1] = -0.125 |
| | DDA[2] = 0.750 | | DDA[2] = 0.250 |
| Src[1] = Line 2 | DDA[3] = 1.125 | | DDA[3] = 0.625 |
| | DDA[4] = 1.500 | Src[1] = Line 3 | DDA[4] = 1.000 |
| | DDA[5] = 1.875 | | DDA[5] = 1.375 |
| Src[2] = Line 4 | DDA[6] = 2.250 | | DDA[6] = 1.750 |
| | DDA[7] = 2.625 | Src[2] = Line 5 | DDA[7] = 2.125 |
| Src[3] = Line 6 | DDA[8] = 3.000 | | DDA[8] = 2.500 |
| | DDA[8] = 3.375 | Src[3] = Line 7 | DDA[8] = 2.875 |

(a) Upscaling by 3:8 from the top field (b) Upscaling by 3:8 from the bottom field

Figure 15.

| Source<br>(Top field) | Destination<br>(Display) | Source<br>(Bottom field) | Destination<br>(Display) |
|---|---|---|---|
| Src[0] = Line 0 | DDA[0] = 0.000 | | DDA[0] = -0.250 |
| | | Src[0] = Line 1 | |
| | DDA[1] = 0.375 | | DDA[1] = 0.125 |
| | DDA[2] = 0.750 | | DDA[2] = 0.500 |
| Src[1] = Line 2 | | | |
| | DDA[3] = 1.125 | Src[1] = Line 3 | DDA[3] = 0.875 |
| | DDA[4] = 1.500 | | DDA[4] = 1.250 |
| | DDA[5] = 1.875 | | DDA[5] = 1.625 |
| Src[2] = Line 4 | | | |
| | DDA[6] = 2.250 | Src[2] = Line 5 | DDA[6] = 2.000 |
| | DDA[7] = 2.625 | | DDA[7] = 2.375 |
| Src[3] = Line 6 | DDA[8] = 3.000 | | DDA[8] = 2.750 |
| | | Src[3] = Line 7 | |
| | DDA[8] = 3.375 | | DDA[8] = 3.125 |

(a) Upscaling by 3:8 from the top field (b) Upscaling by 3:8 from the bottom field

Figure 16.

METHOD AND APPARATUS FOR PERFORMING VIDEO IMAGE DECODING

The present patent application is a Continuation of application Ser. No. 09/470,741, filed Dec. 20, 1999.

BACKGROUND

1. Field

This disclosure is related to video processing and, more particularly, to decoding video images.

2. Background

Due to implementation constraints, motion compensation hardware employed in video decoding is typically designed for a given video image resolution. For example, without limitation, the MPEG2 specification, ISO/IEC 13818-2 MPEG-2 Video Coding Standard, "Information technology—Generic coding of moving pictures and associated audio information: Video," March, 1995, hereinafter referred to as "MPEG2," may impose a video resolution of 720 pixels times 480 pixels at 30 frames per second. In a conventional design, the engine that performs the decoding will typically only generate images at the video resolution that the compressed video bit stream specifies. As a result of the amount of memory employed to hold decoded images, higher resolution compressed video bit streams, such as MPEG2 bit streams for digital television (DTV) content, for example, will not run on such a system. If sufficient memory is available to decode at the full specified resolution, and a user chooses to view the video on a smaller window on a computer platform, for example, downscaling is performed on the full size decoded image at display time and, therefore, full resolution decoding is still employed. A need, therefore, exists for a method or technique for a system to operate on or produce video resolutions other than the resolutions specified by the compressed video bit stream providing the video or image data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

FIG. 4 is a schematic diagram illustrating the result on a macroblock of applying another embodiment of a method for performing video decoding in accordance with the present invention;

FIG. 5 is a schematic diagram illustrating the result on a macroblock of applying yet another embodiment of a method for performing video decoding in accordance with the present invention;

FIG. 15 is a schematic diagram illustrating the results of a DDA-based vertical scaling operation for uniformly-positioned interlaced video source, such as may be employed in an embodiment in accordance with the invention; and FIG. 16 is a schematic diagram illustrating the results of a DDA-based vertical scaling operation for non-uniformly-positioned interlaced video source, such as may be employed in an embodiment in accordance with the invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in details so as not to obscure the present invention.

As previously indicated, conventionally, a video decode and display system normally designed for a given maximum resolution will typically not operate on bit streams that specify higher video resolutions. Likewise, if a user chooses to view the video in a smaller window, downscaling the bit stream is conventionally achieved at display time and, therefore, full resolution decoding still occurs. Since full resolution decoding followed by downscaling adds cost in the form of additional computation, additional memory, additional memory bandwidth, and complex downscaling at display time, it would be desirable if downscaling of a bit stream could be accomplished without full resolution decoding.

Figure 7:
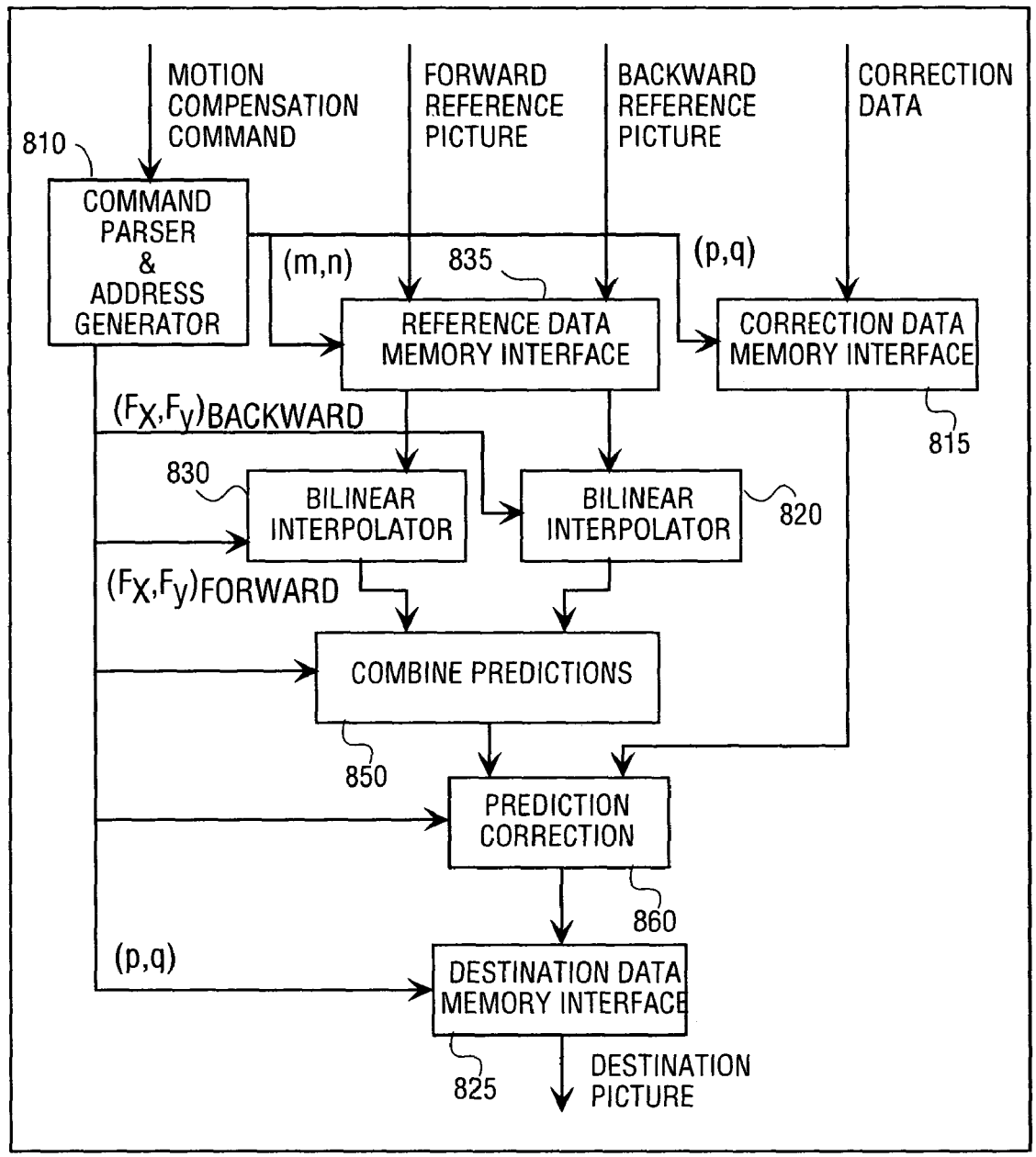
FIG. 7 is a block diagram illustrating an embodiment of hardware that may be employed to implement an embodiment of a method for performing video decoding in accordance with the present invention.
Figure 8:
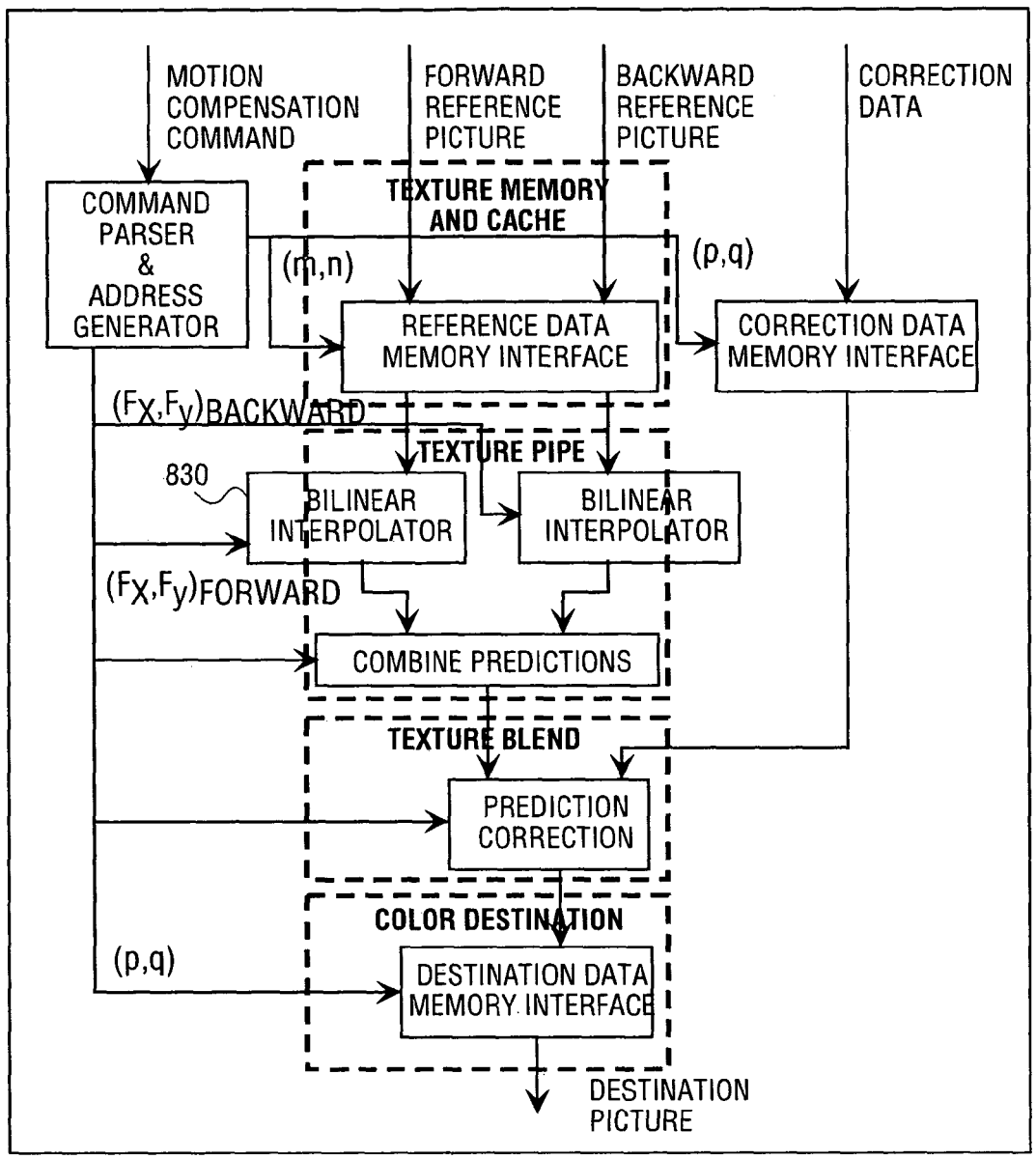
FIG. 8 illustrates FIG. 7 with an overlay to schematically illustrate correspondence with an embodiment of a three-dimensional (3D) rendering pipeline.

Although the invention is not limited in scope in this respect, FIG. 7 is a schematic diagram illustrating an embodiment of a hardware motion compensation engine that may be employed to implement an embodiment of a method of performing video decoding in accordance with the invention. For example, as shall be described in greater detail hereinafter, a three-dimensional (3D) pipeline may be employed to efficiently perform motion compensation, as illustrated in FIG. 8, although other hardware platforms other than a 3D pipeline may be employed to implement embodiments of a method of performing video decoding in accordance with an embodiment of the invention. FIGS. 7 and 8 are described in more detail hereinafter.

Figure 1:
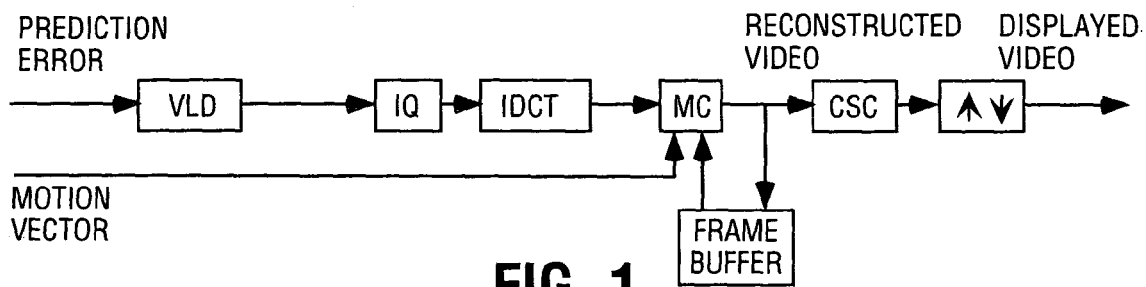
FIG. 1 is a block diagram illustrating an embodiment of a conventional pipeline for decoding compressed digital video images.
Figure 2:
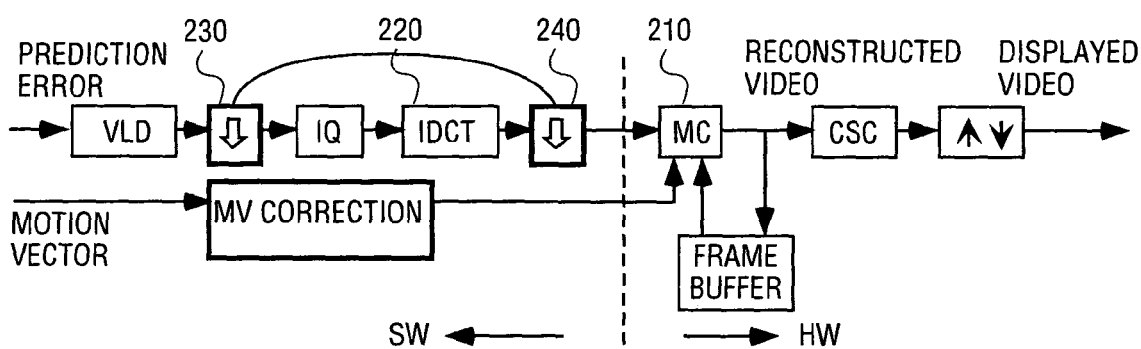
FIG. 2 is a block diagram illustrating an embodiment of an apparatus for performing video image decoding in accordance with the present invention.

FIG. 1 is a block diagram illustrating an embodiment of conventional pipeline for performing video image decoding. FIG. 2 is a block diagram illustrating an embodiment of an apparatus for performing video decoding in accordance with the present invention. In one embodiment in accordance with the invention, as shall be described in greater detail hereinafter, a compressed video image in the frequency domain is downsampled at 230 and then inverse transformed at 220. Motion compensation is performed on the downsampled image in the spatial domain at 210. Alternatively, as shall also be described in greater detail hereinafter, the compressed image in the frequency domain may be inverse transformed at 240 and then downsampled in the spatial domain and motion compensated. Although the invention is not limited in scope in this respect, one example of a compressed video image in the frequency domain comprises a discrete cosine transform (DCT) image. Likewise, although the invention is not limited in scope in this respect, such a DCT image may comply with the MPEG2 specification, as shall be described in greater detail hereinafter. In this context, although MPEG2 is referred to, including the aspect that divides an image into 16×16 macroblocks, the invention is not limited in scope to employing MPEG, including MPEG2, to employing macroblocks of this particular size and shape or even to employing macroblocks at all.

As illustrated in FIG. 2 and as shall be described in greater detail, the DCT image may be downsampled before being delivered to the motion compensation engine. Likewise, as indicated above, downsampling may be applied in this embodiment either before the inverse DCT, such as at 230, or after the inverse DCT, such as at 240, depending upon a variety of factors. In this particular embodiment, although the invention is not limited in scope in this respect, the blocks illustrated in FIG. 2 prior to the vertical line are implemented in software and the blocks after the vertical line are implement in hardware. Conventionally, such video processing to accomplish downsampling would be performed in hardware; however, an advantage of an embodiment of a method of performing video decoding in accordance with the present invention is that it provides the capability to perform the processing in software due at least in part to greater processing efficiency in comparison with conventional approaches. Therefore, one advantage of this approach is that it provides greater flexibility. In such an embodiment, the decoder software may transfer the downsampled prediction error to the motion compensation hardware and the motion vectors may be adjusted substantially in accordance with the downsampling ratio, as explained hereinafter. In this particular embodiment, although, again the invention is not limited in scope in this respect, downsampling ratios of 1:1, 2:1, 4:1, and 8:1, along either of the horizontal, vertical or both directions, may be supported. In this particular embodiment, where MPEG2 is employed, the downsampling ratio is limited to no more than 8:1 due to the native eight-by-eight MPEG2 block size. However, this limitation may not apply in alternative embodiments. Furthermore, in alternative embodiments, even for MPEG2, downsampling ratios other than a power of two may be implemented, such as, for example, 3:1.

As illustrated in FIG. 2, the motion compensation hardware may operate directly on the downsampled bit stream. In this particular embodiment, where MPEG2 is employed, the downsampling ratio may be n, where n equals 1, 2, 4, and 8. In a motion compensation process, a motion vector of a processed macroblock specifies the relative distance of reference data from the processed macroblock. Let $(V_x, V_y)$=(vector[r][0], vector[r][1]) be the original motion vector for a macroblock, where $V_x$ and $V_y$, the horizontal and vertical components of the motion vector, are in the form of 16-bit signed value, although the invention is not limited in scope in this respect. According to the MPEG2 standard, the least significant bit (LSB) of $V_x$ and $V_y$ is used to indicate the half-pixel resolution reference. Denote the whole pixel motion displacement for the luminance component by $(D_x^Y, D_y^Y)$, and the fractional offset for the luminance component by $(F_x^Y, F_y^Y)$. Due to limited subpixel precision, the fractional offset $(F_x^Y, F_y^Y)$ may also be called as the half-pixel offset flag. When there is no downsampling to the bitstream, these may be calculated from the motion vector as follows:

$$\begin{cases} D_x^Y = V_x >> 1, \\ D_y^Y = V_y >> 1, \end{cases} \qquad [1]$$

and $$\begin{cases} F_x^Y = V_x \& 1, \\ F_y^Y = V_y \& 1. \end{cases} \qquad [2]$$

where ">>" indicates a right shift operation and "&" indicates a "logic AND" operation. If $F_x^Y$ is set, or precisely is non-zero, horizontal interpolation, such as computing an average, may be applied to the reference pixels. If $F_y^Y$ is set, vertical interpolation, such as computing an average, may be applied to the reference pixels. If both are set, interpolations along both directions may be applied.

The chrominance motion displacement may also derived from the same set of motion vector signal information. For YUV 4:2:0 color space format, for example since the dimension of chrominance (Cb, Cr) pictures is half of that of the luminance component picture along both horizontal and vertical directions, the whole pixel displacement $(D_x^C, D_y^C)$ and fractional offset $(F_x^C, F_y^C)$ for the chrominance components of the processed macroblock may be determined as follows:

$$\begin{cases} D_x^C = (V_x/2) >> 1, \\ D_y^C = (V_y/2) >> 1, \end{cases} \quad [3]$$

and $$\begin{cases} F_x^C = (V_x/2) \& 1, \\ F_y^C = (V_y/2) \& 1, \end{cases} \quad [4]$$

where symbol '/' denotes regular integer division with truncation of the result toward zero. Notice that in this example the chrominance fractional offset is also in half chrominance pixel resolution.

Ignoring the luminance and chrominance superscripts of terms $(D_x, D_y)$ and $(F_x, F_y)$, the motion prediction operation may be, in one embodiment, implemented with simple adders and shifters as the following pseudo-code illustrates.

```
MC_Prediction(p, q)
{
    if( Fx !=1 && Fy != 1)      /* full-pel prediction in both directions */
        P[q][p] = R[n][m];
    if( Fx ==1 && Fy != 1)      /* full-pel vertical, half-pel horizontal */
        P[q][p] = (R[n][m]+ R[n][m+1]) //2;
    if( Fx !=1 && Fy == 1)      /* half-pel vertical, full pel horizontal */
        P[q][p] = (R[n][m] + R[n+1][m]) //2;
    if( Fx == 1 && Fy == 1)     /* half-pel prediction in both directions */
        P[q][p] = (R[n][m] + R[n][m+1] + R[n+1][m] + R[n+1][m+1]) //4
} // end Mc_Prediction(p, q)
```

In this example, the division symbol "//" denotes rounding up to the next larger integer (rounding away from zero). Symbols p and q represent integer indices in the destination image along horizontal and vertical directions, respectively. Symbols m and n represent integer indices in the reference image along horizontal and vertical directions, respectively. The reference pixel location (m, n) may be derived from the motion vector displacement term $(D_x, D_y)$.

Figure 10:
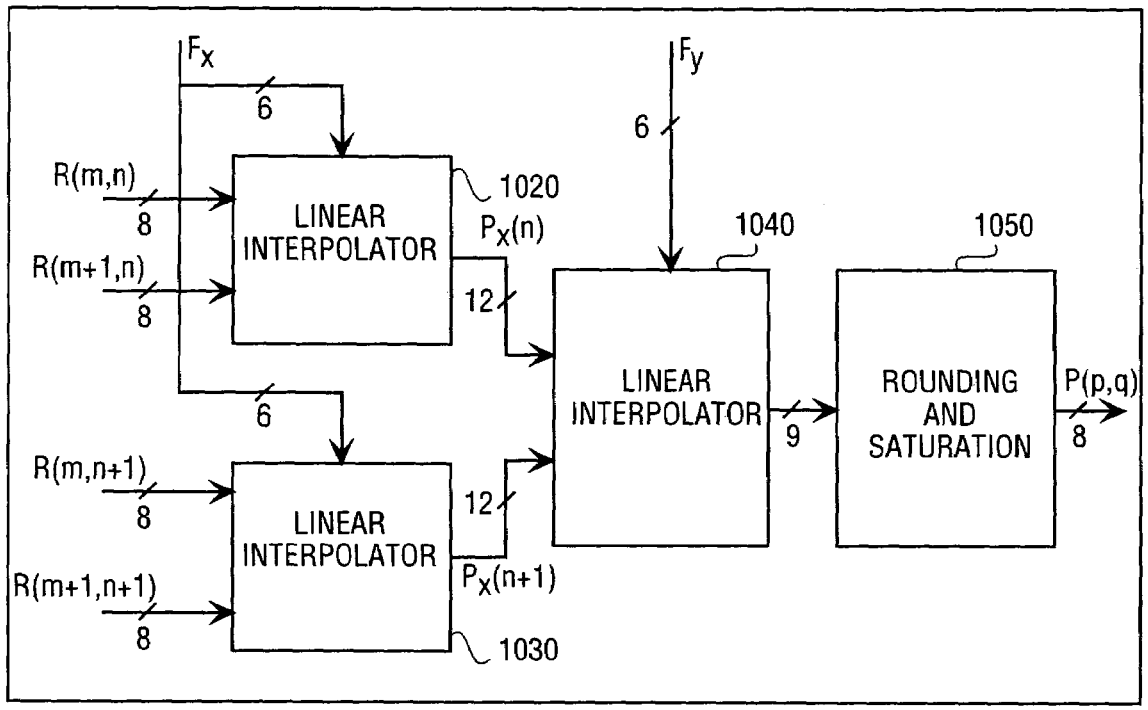
FIG. 10 is a block diagram illustrating an embodiment of a bilinear interpolator such as may be employed in an embodiment of a method for performing video decoding in accordance with the present invention.
Figure 11:
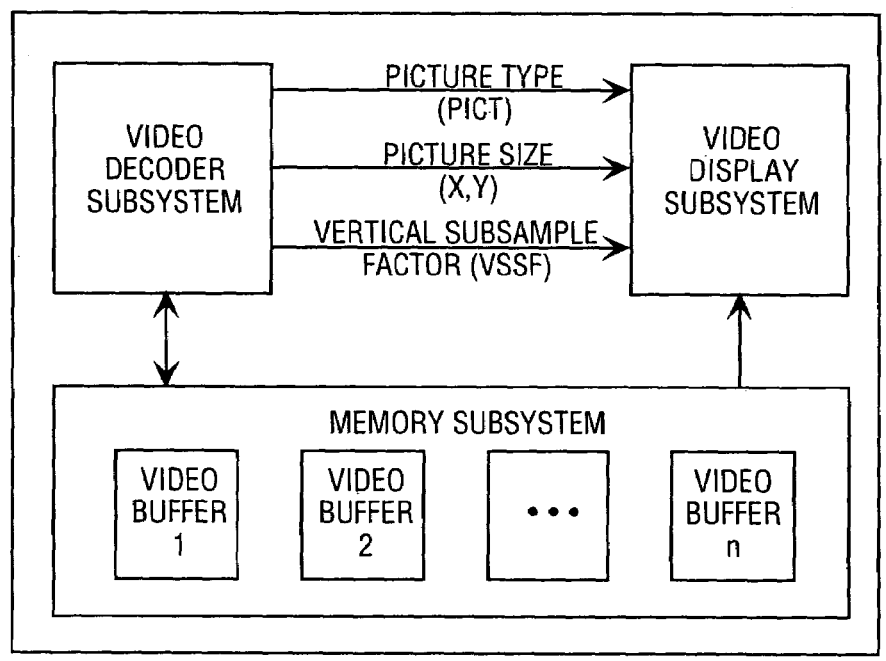
FIG. 11 is a block diagram illustrating an embodiment of a video decoder subsystem coupled with a video display subsystem, such as may employ an embodiment of a method for performing video decoding in accordance with the present invention.

In this particular embodiment of the invention, the motion-compensated prediction applied to the downsampled bit stream is performed directly using the downsampled reference images and the original motion vectors decoded from the compressed bitstream. The motion vectors used in the prediction may also be specified by the motion displacement $(D_x^Y, D_y^Y)$ $(D_x^C, D_y^C)$ and motion fractional offset $(F_x^Y, F_y^Y)$, $(F_x^C, F_y^C)$ with reference to the downsampled image. Contrary to conventional motion fractional offset that is only a one bit value in MPEG2, as previously described, more precision is preserved for $(F_x^Y, F_y^Y)$, $(F_x^C, F_y^C)$ in a downsampling operation in this particular embodiment in accordance with the invention. Consequently, the simple averaging operation described above may be replaced by more accurate interpolation operations. In one embodiment, for example, a bilinear interpolation unit may be used in the motion prediction calculation of motion compensation, although the invention is not limited in scope in this respect. The video or image reconstruction quality may also be improved by using a higher order interpolation unit. A bilinear interpolator typically employs more hardware than an averaging based interpolator. However, it is a common feature that may be provided as part of a state-of-the-art graphics controller hardware. For example, it may be found in the texture pipeline of a three-dimensional (3D) rendering engine or an image processor for image scaling or filtering. In one embodiment, therefore, as illustrated in FIG. 8, a 3D pipeline may include a bilinear interpolator, designated 820 and 830, such as one having a 6-bit interpolation phase value, as shown by FIG. 10. In such an embodiment, although the invention is not limited in scope in this respect, motion displacement and motion fractional offset may be calculated from motion vectors, decoded from the compressed bitstream as follows:

$$\begin{cases} D_x^Y = V_x >> SubD_x \\ D_y^Y = V_y >> SubD_y \end{cases} \text{and} \begin{cases} D_x^C = (V_x/2) >> SubD_x \\ D_y^C = (V_y/2) >> SubD_y \end{cases} \quad [5]$$

and

-continued $$\begin{cases} F_x^Y = (V_x \& FMaskD_x) << SubR_x \\ F_y^Y = (V_y \& FMaskD_y) << SubR_y \end{cases} \quad [6]$$

and $$\begin{cases} F_x^C = ((V_x/2) \& FMaskD_x) << SubR_x \\ F_y^C = ((V_y/2) \& FMaskD_y) << SubR_y \end{cases}.$$

For these relationships and this embodiment, values for the subsampled displacement shifts $SubD_x$ and $SubD_y$, the subsampled fractional masks $FMaskD_x$, $FMaskD_y$, and the subsampled bilinear interpolation phase shifters $SubR_x$, $SubR_y$, based at least in part on the downsampling ratio, may be determined. These are provided in Table 1, below, for a system with 6-bit interpolation phase value range. It will be appreciated that the values for a system with a different interpolation precision may, likewise, be derived as desired. It will also be appreciated the corresponding interpolation parameters for a system with a different interpolation filter other than a bilinear interpolation filter may also be derived as desired.

TABLE 1

Variables that are used to set the bilinear
interpolation parameters for downsampling.

| | Downsampling Ratio | | | |
|---|---|---|---|---|
| | 1:1 | 2:1 | 4:1 | 8:1 |
| SubD$_x$ or SubD$_y$ | 1 | 2 | 3 | 4 |
| FMaskD$_x$ or FMaskD$_y$ | 0x01 | 0x03 | 0x07 | 0x0F |
| SubR$_x$ or SubR$_y$ | 5 | 4 | 3 | 2 |

With the above equations defining the motion displacement and motion fractional values, the motion-compensated prediction may be described for this embodiment by the following bilinear interpolation relation:

$$P[q][p] = \{(0 \times 40 - F_y) \cdot [(0 \times 40 - F_x) \cdot R[n][m] + F_x \cdot R[n][m+1]] + \quad [7]$$
$$F_y \cdot [(0 \times 40 - F_x) \cdot R[n+1][m] + F_x \cdot R[n+1][m+1]]\} //$$
$$0 \times 80 = \{(0 \times 40 - F_y) \cdot [(0 \times 40 - F_x) \cdot R[q+D_y][p+D_x] +$$
$$F_x \cdot R[q+D_y][p+D_x+1]] +$$
$$F_y \cdot [(0 \times 40 - F_x) \cdot R[q+D_y+1][p+D_x] +$$
$$F_x \cdot R[q+D_y+1][p+D_x+1]]\} // 0 \times 80.$$

where, the reference pixel location (m, n) is derived from the motion vector displacement term ($D_x, D_y$).

Figure 9:
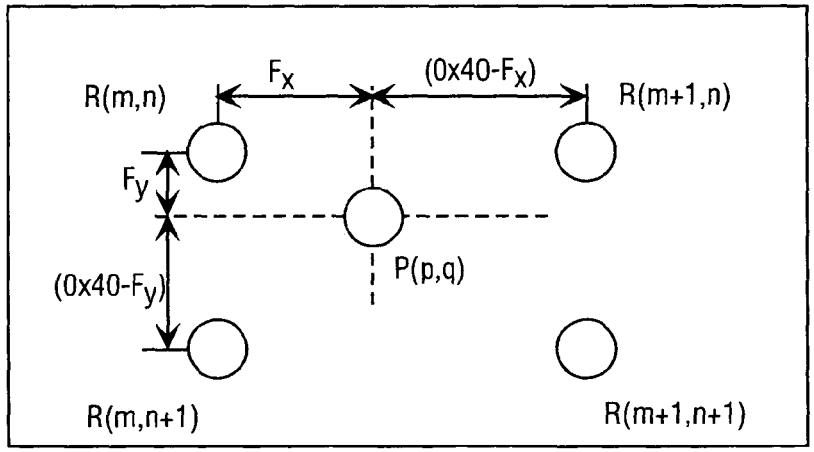
FIG. 9 is a schematic diagram illustrating the pixel operation of a bilinear interpolation, such as may be employed in an embodiment of a method for performing video decoding in accordance with the present invention.

FIG. 9 illustrates the spatial relationship of the four reference pixels contributing to the prediction of the reconstructed pixel for this embodiment. As previously indicated, one embodiment of a bilinear interpolator is illustrated in FIG. 10. In this embodiment, bilinear interpolator 1001 is formed by two linear interpolators, 1020 and 1030, that operate along one spatial direction followed by another linear interpolator, 1040, that operates along the orthogonal direction. The output signal from linear interpolator 1040 passes through a rounding and saturation unit 1050 that converts the output signal to a specified finite precision form, although the invention is not limited in scope in this respect, and this is just one example of a bilinear interpolator embodiment. Furthermore, the invention is not limited in scope to employing bilinear interpolation.

For this embodiment, the above mentioned motion compensation operation may be implemented with a hardware motion compensation system, such as the one, 701, illustrated in FIG. 7, although, again, the invention is not limited in scope in this respect. Here, the operation is applied on a macroblock basis, however, as previously indicated, this is merely a feature of MPEG2 and alternative embodiments are possible. The operation of this particular embodiment shall now be described in detail. Command parser and address generator unit 810 receives motion compensation instructions for a given macroblock and generates destination addresses and transmits the destination addresses to correction data memory interface unit 815 and destination data memory interface unit 825. Correction data memory interface unit 815 uses this(these) destination address(es) to load correction data from a correction data buffer(not shown). Destination data memory interface unit 825 uses this(these) destination addressees) to send the final output data from the motion compensation engine to the destination buffer(not shown). Command parser and address generator unit 810 also generates a prediction address (or addresses) in the reference picture or image using information about the current macroblock and its motion vectors and sends this to reference data memory interface unit 835. The reference data memory interface unit uses this to load data from a forward reference buffer, or from a backward reference buffer, or from both a forward reference buffer and a backward reference buffer(not shown).

The command parser and address generator unit also generates subpixel fractional information to be applied to the bilinear interpolation units, 820 and 830. Of these two bilinear interpolation units, one performs forward prediction and one performs backward prediction. Here, each bilinear interpolation unit uses the fractional information to interpolate data from the reference buffer. It is conceivable that these two bilinear interpolation units may be implemented as a single hardware unit. In the case of a single hardware bilinear interpolation unit is implemented, this bilinear interpolation unit may be used sequentially if forward and backward bi-directional prediction is desired.

The output signals from the forward bilinear interpolation unit and the backward bilinear interpolation unit are added together in combine predictions unit 850. The combine predictions unit performs proper scaling and saturation to the data, such as according to a compression standard, such as, for example, MPEG2. The output signal from the combine predictions unit is then sent to prediction correction unit 860 and the correction data are added to the motion prediction data and final output data, for this embodiment, are generated. The output data from the prediction corrections unit is then sent to memory by the destination data memory interface.

As illustrated in FIG. 8, the above mentioned embodiment of motion compensation implementation may be implemented using existing 3D rendering hardware that is currently a common feature in graphics controller hardware. The boxes in dotted lines map the motion compensation aspects of this embodiment just described into some 3D hardware units, for illustration purposes. Of course, other hardware mapping and hardware reusing are also possible and may now be implemented by one of ordinary skill in the art. In this particular embodiment, the reference buffers are mapped as texture buffers. Therefore, the texture memory and texture cache may be used to obtain the reference data load from memory. After that, the 3D texture pipeline that typically contains bilinear interpolators or even tri-linear interpolators may be used to perform the bilinear interpolation and prediction combination operations in motion compensation. Then, the 3D texture blend unit may be used to perform the prediction correction operation. The 3D color and destination memory interface unit may be used to write the output signals of motion compensation to memory.

Figure 6:
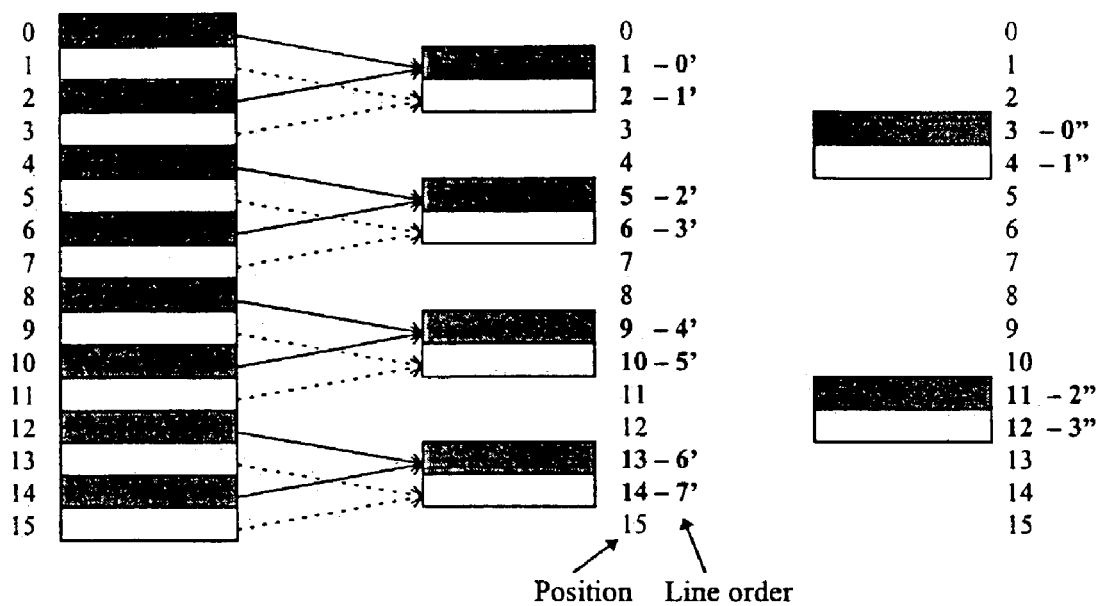
FIG. 6 is a schematic diagram illustrating the result on a macroblock of applying still another embodiment of a method for performing video decoding in accordance with the present invention.

Several embodiments where MPEG2 coding has been employed shall be described. As previously explained, the invention is not limited in scope to these particular embodiments. Any one of a number of other video or image coding specifications and/or storage formats may be employed. Nonetheless, these embodiments are provided as examples of implementations of a method of performing video image decoding in accordance with the present invention. In this context, three main categories of MPEG2 coding types shall be described. One coding type comprises a frame image with frame prediction or frame motion compensation employed. In this context, the term frame image or frame type refers to a progressive sequence display of data signals for an image, such as is commonly employed on computer platforms having monitors. The term frame prediction or frame motion compensation refers to a particular format for the prediction error and for the motion vectors that have been coded or produced by an encoder. It is desirable to know the format in which this signal information is encoded in the bitstream in order to perform decoding to reconstruct the image that produced this signal information. Therefore, if frame prediction or frame decoding is employed, then the prediction error is stored in a frame format, analogous to the format employed for a frame image. A second coding type comprises a field image with field motion compensation or field prediction. The term field image or field type generally refers to a technique commonly employed for television sets or television set displays in which half of the image is displayed separately at a rate that allows the human eye to merge the images. In this format, field data lines, that is, lines of signal data from a field image, are stored in an interlaced format. Therefore, top field and bottom field lines are alternated or interlaced within a frame of signal data. The term field motion compensation or field prediction refers to the format in which the prediction error and motion vectors are stored in which prediction may be predicated upon the so-called top fields or bottom fields independently. In a field encoded image, the top and bottom fields are each encoded as separate images, and then displayed in an interlaced format. The motion prediction data for the top and bottom fields in this case is based in part on recently decoded fields. A third MPEG2 coding type employed in this context comprises a frame image with field motion compensation or field prediction. In this format, both fields are encoded as a single image, but the motion compensation data for each of its two fields is based in part on previously decoded fields. In MPEG2, this third format has two variations. In one variation, such as illustrated in FIG. 5, the luminance DCT data is encoded on a frame basis, while in the other variation; such as illustrated in FIG. 6, the luminance DCT data is stored on a field basis. This coding type is between the two coding types mentioned above in that both formats may be interspersed on a macroblock basis. More specifically, on a macroblock basis, data signals may be stored as a frame image with either field or frame prediction.

Because these particular embodiments relate to a DCT domain downsampling implementation for MPEG2 coding types, downsampling and motion compensation that is applied to the vertical direction will be employed. The horizontal direction in a video frame is handled similarly for the MPEG2 coding types described above, and therefore, in this embodiment, the horizontal direction is handled in a similar manner as the approach described below for a frame image with frame prediction, although, in a particular implementation of video image decoding in accordance with the present invention, this aspect may vary. Further, the illustrations given herein illustrate the technique for luminance component only. Nevertheless, an extension of this technique, once described, to handle the chrominance component of MPEG is within the ability of one of ordinary skill in the art. Further, in other applications with multiple components encoded in the bitstream, such as, but not limited to, RGB encoded JPEG images, the extension of the technique described herein to each of the components is within the ability of one of ordinary skill in the art.

Figure 3:
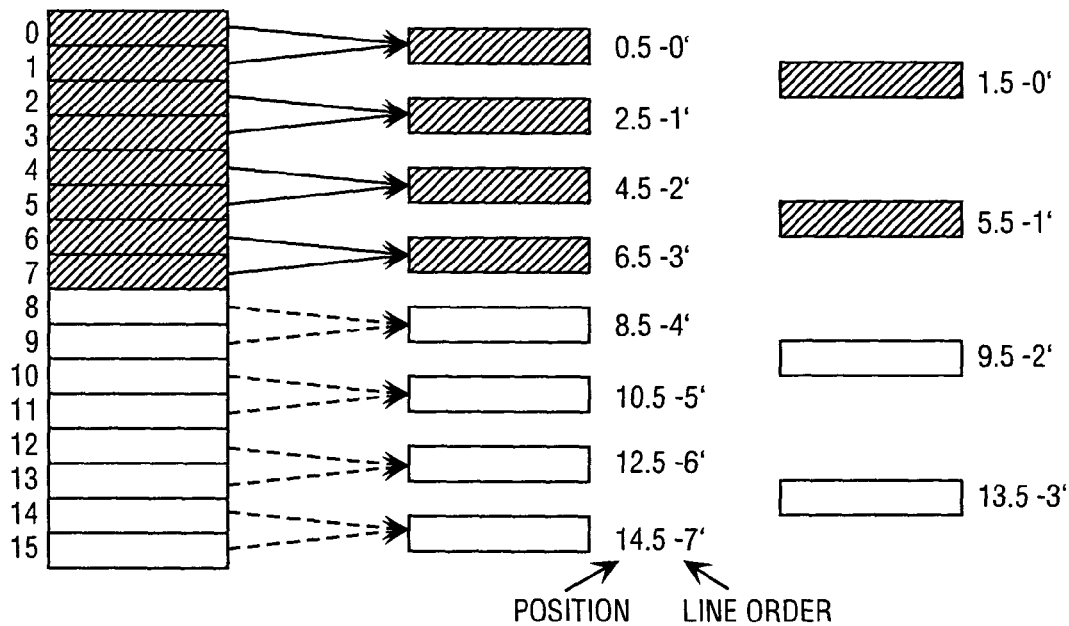
FIG. 3 is a schematic diagram illustrating the result on a macroblock of applying an embodiment of a method for performing video decoding in accordance with the present invention.

FIG. 3 is a schematic diagram of an embodiment of a method for performing video image decoding in accordance with the present invention in which a DCT image that complies with the MPEG2 specification is employed. In this particular embodiment, a frame image with frame motion compensation, as described above, is the MPEG2 coding type employed. FIG. 3 illustrates two 8×8 luminance blocks in a macroblock in which downsampling in the DCT domain occurs. Column 1 illustrates spatial positioning for data lines of the two blocks prior to downsampling. Column 2 illustrates spatial locations for the data lines after downsampling. Therefore, column 2 illustrates the effect on the data positioning of downsampling in the DCT domain and then performing the inverse DCT. Likewise, as FIG. 3 illustrates, column 3 illustrates downsampling for a ratio of 4:1, as opposed to a ratio of 2:1 for column 2. As shown in FIG. 3, the downsampled lines are uniformly distributed in space after downsampling and inverse transforming. This would occur in this embodiment in a similar way for the downsampled pixels in the horizontal direction. Therefore, the downsampled frame image and frame motion vectors may be in a manner similar to the approach applied to the original image. The result of downsampling is to convert the 16×16 macroblocks and the 8×8 blocks they contain to smaller blocks. For example, after 2:1 horizontal subsampling and 4:1 vertical subsampling, each 8×8 block is decoded into a 4×2 block, and each 16×16 macroblock is decoded into an 8×4 macroblock. Thus, motion compensation for any given downsampled block, such as blocks with size 4×4, 4×2, 2×4, 2×2, or 1×1 in this embodiment, may be directly conducted on the downsampled references using scaled motion vectors employing, in this particular embodiment, the technique described previously. Therefore, although the invention is not limited in scope in this respect, the previously described motion compensation hardware may be efficiently employed to perform this signal processing operation.

FIG. 4 is a diagram illustrating an embodiment of a method for performing video image decoding in accordance with the present invention in which another MPEG2 coding type is employed. In this particular embodiment, a field image with field motion compensation is employed, as described above. Considering the nature of the two temporally separated fields for one frame, field based downsampling may introduce spatial aliasing and/or a non-uniform positioning of the lines from the two fields. The non-uniform positioning that may result is illustrated in FIG. 4 in which, again, downsampling has been applied, and then the inverse DCT, to illustrate the effect on this coding type. However, the non-uniform line spacing does not affect motion vectors. Likewise, adjustments to the line positioning illustrated in FIG. 4, such as for the prediction error, may. be accomplished using interpolation techniques such as bilinear interpolation. Again, the 3D hardware pipeline previously described may be employed to implement these interpolations. Therefore, in this particular embodiment, motion compensation, as well as the spatial positioning of the downsampled blocks, should include the exact line positioning for each field.

In another embodiment, instead of employing the approach illustrated in FIG. 4, which produced non-uniform vertical line spacing, selected taps may be employed for the top field and bottom field lines to produce a downsampled image that is uniformly spaced in the vertical direction. For example, although the invention is not limited in scope in this respect, two spatial filters, one respectively for each of the bottom and top fields, may be employed. In addition, a similar approach may alternatively be employed in the frequency domain, such as the DCT domain. Where it is employed in the frequency domain, the transformed data signals may be phase shifted, rather than spatially shifted. The relation of a spatial shift and its corresponding transform domain operation may be derived using convolution property of the particular transform.

FIGS. 5 and 6 each illustrate portions of embodiments of a method for performing video image decoding in accordance with the present invention for an MPEG2 coding type described as a frame image with field motion compensation. FIG. 5 illustrates application of a portion of an embodiment of a method for performing video decoding in accordance with the invention to a macroblock stored in this format as a frame type with field prediction and frame DCT. In contrast, FIG. 6 illustrates application of a portion of an embodiment of a method for performing video decoding in accordance with the present invention to a macroblock stored in this format as a frame type with field prediction and field DCT. It may be convenient to convert the image data and prediction or motion compensation data to one format, either frame or field. Likewise, conversion to a frame format may generally involve temporal filtering, which might involve a modification of the previously illustrated 3D pipeline hardware. However, of course, the invention is not limited in scope in this respect and this approach may be employed with a hardware pipeline, for example, that includes this feature. In this particular embodiment, however, operations are performed to place the frame data in a field format, and to place the frame motion compensation data into a field motion compensation format. Each field is then processed separately in the spatial domain to accomplish motion compensation, in this particular embodiment.

One modification, then, for this particular embodiment is to convert a frame downscaled macroblock into a field downscaled macroblock. In this particular embodiment, as illustrated in FIG. 5, this is accomplished by reconstruction of the blocks in a macroblock at full vertical resolution in the spatial domain by inverse transformation from the DCT domain, interlacing the block into two fields and downscaling it vertically in the spatial domain. Therefore, for this embodiment, the vertical downscaling is effectively moved to after performing the inverse DCT, as illustrated in FIG. 1. Likewise, motion compensation is performed on each field separately, as mentioned above. If the motion compensation were frame based, then, in this embodiment, the prediction error could be converted to field based using the technique illustrated. To convert frame motion vectors to field based, the frame motion vector may be employed for each of the top and bottom field motion vectors. A difference between the embodiments illustrated in FIG. 5 and FIG. 6 is whether the macroblock is stored as a frame macroblock or a field macroblock. As previously discussed, if it is stored as a frame macroblock, then interleaving is performed as illustrated in FIG. 5. In contrast, as illustrated in FIG. 6, if the macroblock is stored as a field macroblock, then interleaving is performed, as illustrated, and the data lines may be processed as previously described for an interleaved field format.

An aspect of an embodiment in accordance with the invention is the downscaling of a video image in the frequency domain, such as an MPEG2 image in the DCT domain, although the invention is not limited in scope in this respect. This may be discussed by referring to one-dimensional (1D) signals. The results for 2D signals would be an extension of this approach due to the separability of operations. Likewise, the case of 2:1 downscaling will be discussed as representative of other downscaling ratios. In general, implementing downscaling in the frequency domain is well-known and there are many well-known ways to accomplish it. The invention is not restricted in scope to a particular approach and this discussion is provided as only one example.

The filtering of finite digital signals in the sample domain is performed using convolution. A well-known circular convolution may be obtained, for example, by a periodic extension of the signal and filter. It may be efficiently performed in the discrete Fourier transform (DFT) domain by simple multiplication of the discrete Fourier transforms of the signal and filter and then applying the inverse DFT to the result. For the DCT, a convolution may be applied that is related to, but different from the DFT convolution. This is described, for example, in "Symmetric Convolution and the Discrete Sine and Cosine Transforms," by S. Martucci, IEEE Transactions on Signal Processing, Vol. 42, No. 5, May 1994, and includes a symmetric extension of the signal and filter, linear convolution, and applying a window to the result. For example, assuming that the signal is represented as s(n), n=0, . . . , N−1, and its corresponding transform (DCT domain) coefficients is represented as S(u), u=0, . . . , N−1, and the filter is represented as h(m), m=0, . . . , M−1, then the DCT may be represented in matrix form as S=C*s, with s, S being column vector form of the signal and its DCT coefficients and C being the DCT matrix, as follows:

$$C_{u,n} = (2/N)^{1/2} k(u) \cos [\pi(u(2n+1)/2N)], \text{ where } u,n=0, \ldots, N-1 \quad [8]$$

where $k(u) =$

·$1/\sqrt{2}$, where $u=0$

·1, $u=1, \ldots, N-1$ [9]

Assume a symmetric low pass even length filter h(m) with filter length M, where M=2*N, the DCT coefficients H(u) for the filter may be obtained by applying the convolutional form described above to the right half of the filter, which is equivalent to multiplication of the right half coefficients by the transform matrix:

$$D_{u,m} 2 \cos [\pi u(2m+1)/2n], \text{ where } u,m=1, \ldots, N-1 \quad [10]$$

The filtering is then performed by element-by-element multiplication of the signal DCT coefficients and the filter DCT coefficients and taking the appropriate inverse DCT transform of the DCT-domain multiplication results:

$$Y(u) = S(u)*H(u), \text{ where } u=0, \ldots, N-1 \quad [11]$$

Not only filtering, but also downsampling, may be performed in the DCT domain. For downsampling by two, the result of the element-by-element multiplication is folded across the middle half point and subtracted and after that scaled by $1/\sqrt{2}$. Mathematically, this is illustrated as:

$$[Y(u) - Y(N-u)]/\sqrt{2}, \text{ where } u=0, \ldots (N/2)-1 \quad [12]$$

The decimated signal is then obtained by applying the inverse DCT transform of the length N/2. There are several special cases that might be usefully applied in this embodiment, although the invention is not limited in scope in this respect. For example, a brickwall filter with coefficients [1 1 1 1 0 0 0 0] in the DCT domain may be implemented that can further simplify the DCT domain downsampling by two operation. Specifically, the special filter shape avoids folding and addition. Another filter with coefficients [1 1 1 1 0.5 0 0 0] provides a transform function of an antialiasing filter for the downsampling by two operation. Other filters may also be employed, of course.

Likewise, it will be appreciated that in this particular embodiment, a low pass, linear interpolation filter has been implemented to perform the downsampling; nonetheless, the invention is not limited in scope in this respect. For example, linear filters other than low pass filters or, alternatively, non-linear filters, such as, for example, a median filter, an adaptive edge-enhancement filter may be employed. It will, of course, be appreciated that some linear filters may effectively be implemented using motion compensation hardware and bilinear interpolation, although the invention is not limited in scope in this respect.

Filtering may also be applied after motion compensation or downsampling. More specifically, variations in clarity of the resulting images may become apparent to the human eye, particularly as the images are viewed in sequence. In some embodiments, it may be desirable to smooth these variations or, alternatively, enhance the images having less clarity. Therefore, any one of a number of filters, linear or non-linear, may be applied. For example, an edge. enhancement image may be applied, although the invention is not limited in scope in this respect. Again, it will be appreciated that some linear filters may be effectively implemented using a 3D hardware pipeline and bilinear interpolation.

Of course, as previously indicated, the invention is not restricted in scope to the embodiments previously described. For example, in an alternative embodiment, where a 3D hardware pipeline is employed to implement a bilinear interpolation operation, a 3×3, 4×4, or greater interpolation operation may be implemented in place of a 2×2 bilinear interpolation operation. Likewise, in another alternative embodiment, as greater computational resources are demanded by the decoder in order to keep up with the video bit stream being provided or received, the decoder may be adapted to downsample at higher ratios in order to allow graceful degradation in the quality of the images provided. Likewise, the decoder may be adapted to perform the reverse as well.

In another embodiment, instead of downsampling all video images, the decoder may be adapted to downsample only some of the video images. For example, specific images may be selected for downsampling, such as by transmitting a signal indication, or the decoder may be adapted to downsample a subset of the received video images based at least in part on a predetermined criteria, such as, as one example, decoding I and P frames at full resolution while subsampling B frames. Therefore, any one of a number of approaches may be employed and the invention is not restricted in scope to any particular approach.

Another aspect of an embodiment in accordance with the invention is the display of the decoded video images that are downsampled in the frequency domain, such as an MPEG2 image in the DCT domain, although the invention is not limited in scope in this respect. In this particular embodiment, the video decoder subsystem discussed above is coupled to a video display subsystem as illustrated in FIG. 10. Both the video decoder subsystem and the video display subsystem may couple with the memory subsystem, where decoded video images may reside. As illustrated in FIG. 10, in the memory subsystem, the decoded video images are labeled as video buffer 1, video buffer 2 and so on. The number n of decoded video images may be chosen according to the video decoder and video display subsystems. In such an embodiment, besides typical information, such as the decoded image size (X, Y), the video decoder subsystem may couples with the video display subsystem with additional signals, such as the Picture Type (PICT) and the vertical subsampling factor (VSFF), that relate to the transform-domain downsampling operation. Signals such as PICT and VSFF may be used to adjust the video display subsystem to properly display the decoded video images that are downsampled in the transform domain using an embodiment in accordance with the invention.

The video display subsystem handles displaying the decoded video images on the screen. The size of the desired display video window may not be the same as the source video image. In this case, the source video may be scaled up or down to match the display window size, corresponding to the process of interpolation and decimation, respectively. Quality scaling involves proper filtering of the source video data to reduce aliasing artifacts. In one approach, a finite impulse response (FIR) filter, where only finite number of input pixels contributes to a particular output pixel, is an example of a scaling filter implemented in the video display subsystem. A filter for spatial scaling of a video signal is normally a 2-dimensional (2D) function. In practice, separable filters may be used to reduce the hardware complexity and cost. In other words, the scaling of a video signal is applied to the vertical and horizontal directions independently. In the following, the vertical scaling operation is addressed since it is relevant to the uniform and non-uniform field scan line distribution that the proposed video decoder generates.

For a given source size $N_{src}$ and a destination size $N_{dest}$, the forward scaling factor (in contrary to the backward scaling factor that we will define later) is defined as the ratio of the source size over destination size:

$$S_f = \frac{N_{src}}{N_{dest}} \qquad [13]$$

Denoting the source sampling step as unity, we can define a DDA (Digital Differential Analyzer) value for a given output line as the relative position to the source line vertical positions. Normally, a DDA accumulator contains a fixed-point value. The integer portion of the DDA value, denoted by int(DDA), indicates the closest source line number, while the fractional portion of the DDA value, denoted by fract (DDA), corresponds to the relative distance from that source line. The initial phase of a scaling operation is defined as the initial value of the DDA accumulator ($DDA_0$=DDA(0)) that is associated with the first output line from the scaling filter. Then the sample position of a succeeding output line may be described by the DDA value accumulated by the scaling factor.

$$DDA(n)=DDA(n-1)+S_f, \text{ for } n=1, N_{dest}-1, \qquad [14]$$

where n is the index to the output video lines.

For a source video image that is created by the above mentioned video decoder subsystem and is in a frame type With the transform domain downsampling as illustrated in FIG. 3, its display is similar to the non-downsampled video image, although the scaling factor is different.

Figure 12:
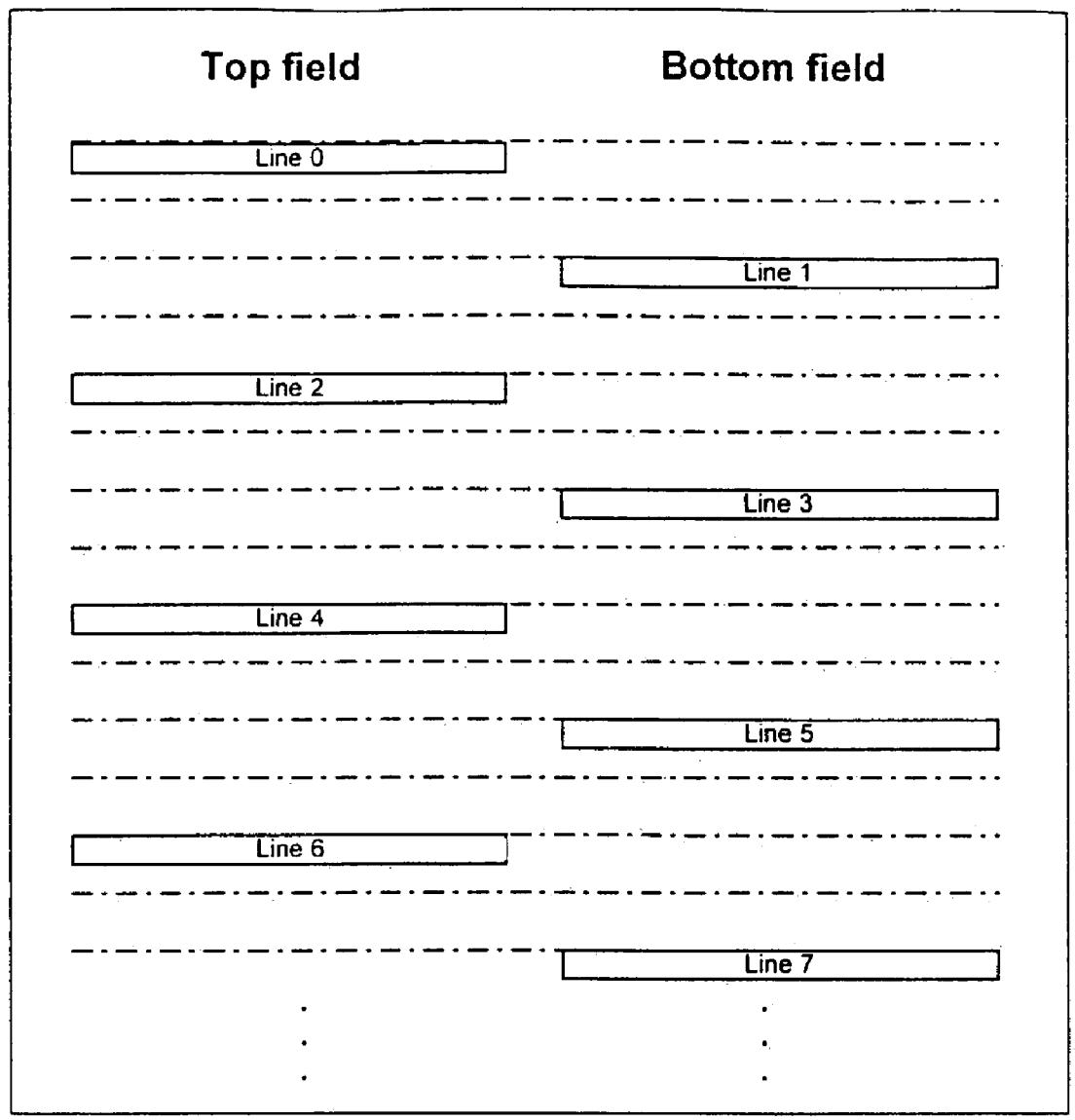
FIG. 12 is a schematic diagram illustrating a scenario of spatial positions of regularly interlaced video data with uniformly positioned fields, where lines in the bottom field are positioned half-way between two lines in the top field, such as may be employed in an embodiment in accordance with the invention.
Figure 13:
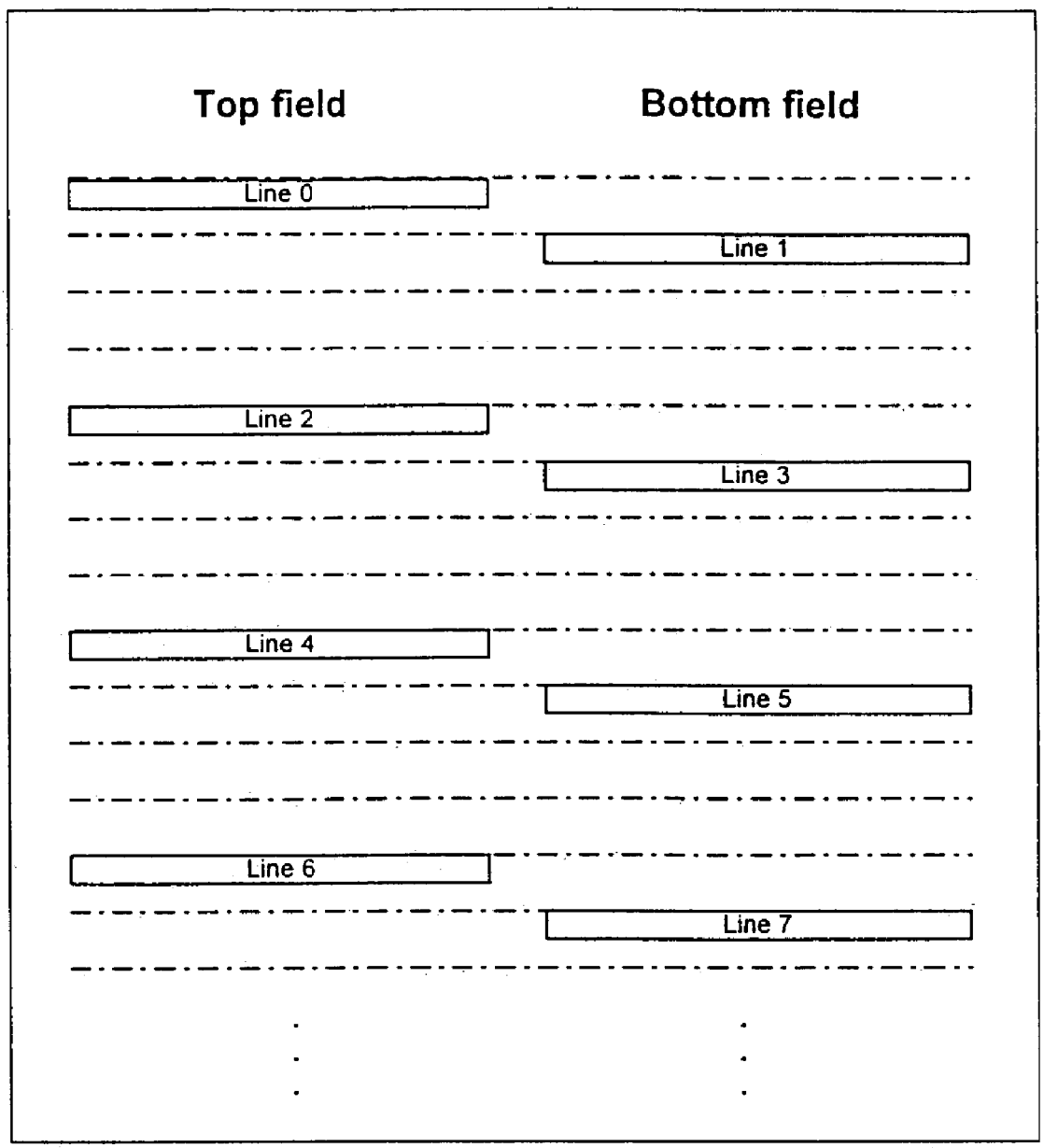
FIG. 13 is a schematic diagram illustrating a scenario of spatial position of regularly interlaced video data with non-uniformly positioned fields, where lines in the bottom field are positioned ¼ of the way between two adjacent lines in the top field, such as may be employed in an embodiment in accordance with the invention.
Figure 14:
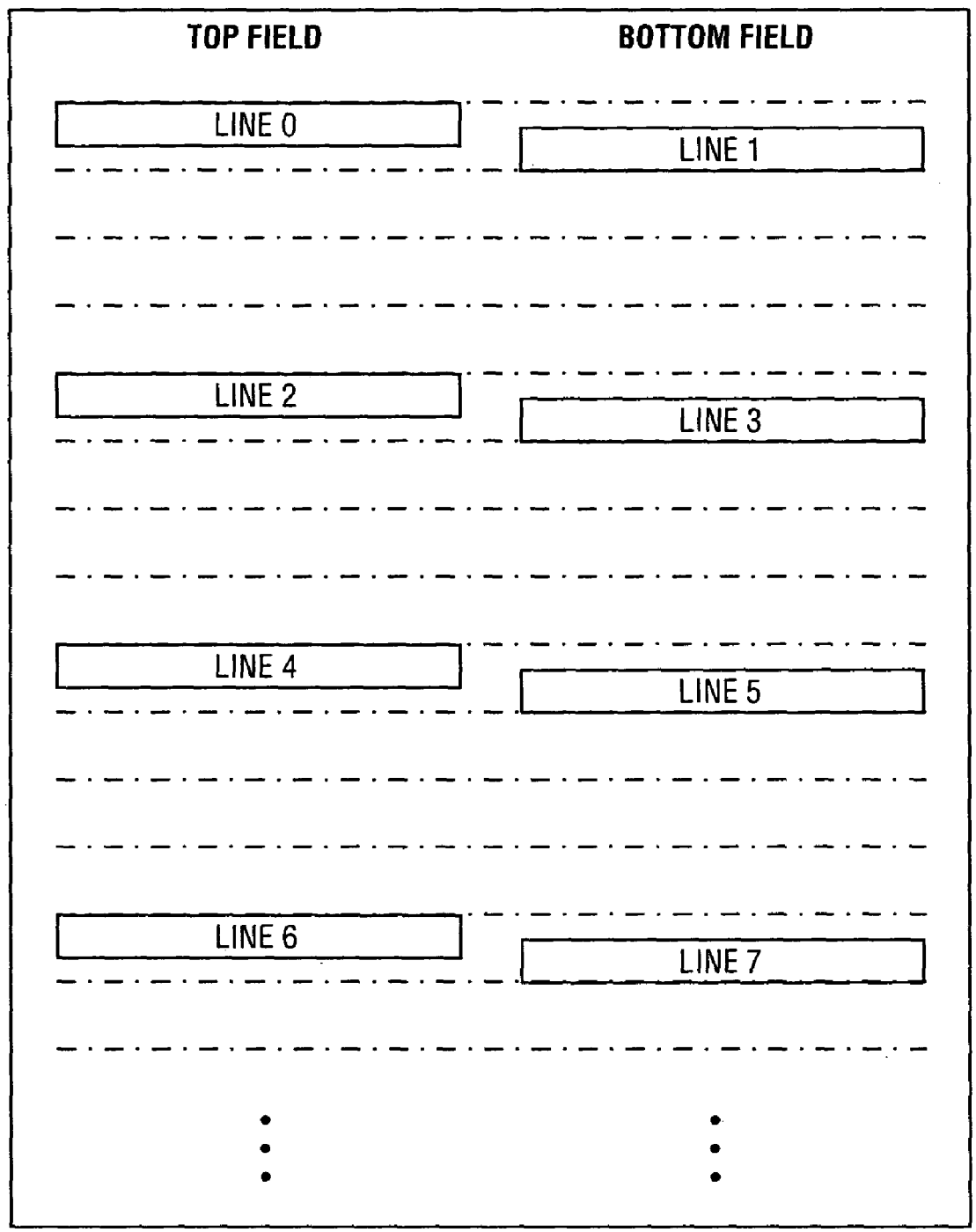
FIG. 14 is a schematic diagram illustrating a scenario of spatial position of regularly interlaced video data with non-uniformly positioned fields, where lines in the bottom field are positioned ⅛ of the way between two adjacent lines in the top field, such as may be employed in an embodiment in accordance with the invention.

For a source video image that is created by the above mentioned video decoder subsystem and is in a field type with the transform domain downsampling but with uniformly distributed scan lines as illustrated in FIG. 12, again, its display method is similar to the non-downsampled field video image, although the scaling factor is different. However, for a source video image that is created by the above mentioned video decoder subsystem and is in a field type with the transform domain downsampling but with non-uniformly distributed scan lines, as illustrated in FIG. 13 and FIG. 14, the conventional field video display method cannot be applied to this kind of video images. Instead, proper vertical position adjustment is employed to display the top and bottom fields of the transform-domain downsampled video images correctly.

Let the distance between two adjacent lines in a field to be 1 unit. As illustrated in FIG. 12, for the non-downsampled field-type video image, the first line in the bottom field (line 1) is 0.5 unit below the first line in the top field (line 0). This is also true for the subsequent lines in the top and bottom fields. The results of a DDA-based vertical scaling operation for uniformly-positioned interlaced video source are illustrated in FIG. 15. The example shows the upscaling factor of 3:8. FIG. 15(*a*) is the case of scaling from the top field with an initial phase of DDA[0]=0.0, and FIG. 15(*b*) is the case of scaling from the bottom field with an initial phase of DDA[0]=−0.5.

When vertical downsampling by two is performed in the transform domain, the first line in bottom field (line 1) is 0.25 units below the first line in the top field (line 0) as illustrated in FIG. 13. FIG. 16 illustrates the results of aDDA-based vertical scaling operation for non-uniformly-positioned interlaced video source. The example shows the upscaling factor of 3:8. FIG. 16(*a*) is the case of scaling from the top field with an initial phase of DDA[0]=0.0, and FIG. 16(*b*) is the case of scaling from the bottom field with an initial phase of DDA[0]=−0.25.

Similarly, FIG. 14 illustrates that the first line in the bottom field is 0.125 units below the fist line in the top field when a vertical downsampling by four is performed in the transform domain.

It will, of course, be understood that, although a particular embodiment has just been described, the invention is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging system, may result in a method of performing video image decoding in accordance with the invention, such as, for example, one of the embodiments previously described.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

The invention claimed is:

1. A method of performing video image decoding comprising:
   downsampling a compressed video image in the frequency domain;
   inverse transforming the downsampled video image; and
   performing motion compensation for the downsampled image in the spatial domain wherein performing motion compensation comprises scaling motion vectors in accordance with a downsampling ratio and motion vector scaling comprises implementing a bilinear interpolation operation implemented on 3D pipeline hardware, motion displacement and motion fractional offset calculated from motion vectors, decoded from a compressed bitstream and values for a subsampled displacement shifts, subsampled fractional masks, and subsampled bilinear interpolation phase shifters determined based at least in part on the downsampling ratio.

2. The method of claim 1, wherein the compressed video image in the frequency domain comprises a discrete cosine transform (DCT) image.

3. The method of claim 2, wherein the DCT image is stored as a DCT image that complies with an MPEG specification.

4. The method of claim 3, wherein the DCT image is stored as a frame type image.

5. The method of claim 4, wherein the motion compensation data signals are stored as frame prediction type motion compensation.

6. The method of claim 3, wherein the DCT image is stored as a field type image.

7. The method of claim 6, wherein the motion compensation data signals are stored as field prediction type motion compensation.

8. The method of claim 1, and further comprising displaying the downsampled spatial image so that resulting non-uniform vertical spacing of data signal lines in the downsampled spatial image appear substantially uniform on a computer monitor.

9. The method of claim 1, wherein the downsampling is performed using an integer ratio.

10. The method of claim 1, wherein the bilinear interpolation operation is implemented on 3D pipeline hardware.

11. A method of performing video image decoding comprising:
    inverse transforming a compressed video image;
    downsampling the inverse transformed image in the spatial domain;
    performing motion compensation for the downsampled image in the spatial domain wherein performing motion compensation comprises scaling motion vectors in accordance with a downsampling ratio and motion vector scaling comprises implementing a bilinear interpolation operation implemented on 3D pipeline hardware;
    calculating motion displacement and motion fractional offset from motion vectors, decoded from a compressed bitstream; and
    determining values for a subsampled displacement shifts, subsampled fractional masks, and subsampled bilinear interpolation phase shifters based at least in part on the downsampling ratio.

12. The method of claim 11, wherein the compressed video image comprises a discrete cosine transform (DCT) image.

13. The method of claim 12, wherein the DCT image is stored as a DCT image that complies with an MPEG specification.

14. The method of claim 13, wherein the DCT image comprises macroblocks stored as frame macroblocks and macroblocks stored as field macroblocks.

15. The method of claim 14, and further comprising: converting the frame macroblocks to field macroblocks prior to downsampling in the spatial domain.

16. The method of claim 14, wherein the motion compensation data signals are stored as field prediction type motion compensation.

17. The method of claim 11, wherein the bilinear interpolation operation is implemented on 3D pipeline hardware.

18. A computer readable medium including instructions that, when executed, cause a computer to:

downsample a compressed video image in the frequency domain;

inverse transform the downsampled video image;

perform motion compensation for the downsampled image in the spatial domain wherein performing motion compensation comprises scaling motion vectors in accordance with a downsampling ratio and motion vector scaling comprises implementing a bilinear interpolation operation implemented on 3D pipeline hardware;

calculate motion displacement and motion fractional offset from motion vectors, decoded from a compressed bitstream; and determine values for a subsampled displacement shifts, subsampled fractional masks, and subsampled bilinear interpolation phase shifters based at least in part on the downsampling ratio.

19. The computer readable medium of claim 18, wherein the compressed video image in the frequency domain comprises a discrete cosine transform (DCT) image.

20. The computer readable medium of claim 19 further including instructions that, when executed, cause the computer to:

store the DCT image as a DCT image that complies with an MPEG specification.

21. The computer readable medium of claim 18, further including instructions that, when executed, cause the computer to:

display the downsampled spatial image so that resulting non-uniform vertical spacing of data signal lines in the downsampled spatial image appear substantially uniform on a computer monitor.

22. A computer readable medium including instructions that, when executed, cause a computer to:

inverse transform a compressed video image;

downsample the inverse transformed image in the spatial domain;

perform motion compensation for the downsampled image in the spatial domain wherein performing motion compensation comprises scaling motion vectors in accordance with a downsampling ratio and motion vector scaling comprises implementing a bilinear interpolation operation implemented on 3D pipeline hardware;

calculate motion displacement and motion fractional offset from motion vectors, decoded from a compressed bitstream; and determine values for a subsampled displacement shifts, subsampled fractional masks, and subsampled bilinear interpolation phase shifters based at least in part on the downsampling ratio.

23. The computer readable medium of claim 22, wherein the compressed video image in the frequency domain comprising a discrete cosine transform (DCT) image.

24. The computer readable medium of claim 23, further including instructions that, when executed, cause the computer to:

as a DCT image that complies with an MPEG specification.

* * * * *